(12) United States Patent
Pursifull et al.

(10) Patent No.: US 11,352,975 B1
(45) Date of Patent: Jun. 7, 2022

(54) METHODS AND SYSTEMS FOR ESTIMATING INJECTOR TIP TEMPERATURES

(71) Applicant: Ford Global Technologies, LLC, Dearborn, MI (US)

(72) Inventors: Ross Pursifull, Dearborn, MI (US); Joseph Thomas, Farmington Hills, MI (US); Paul Hollar, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/304,733

(22) Filed: Jun. 24, 2021

(51) Int. Cl.
*F02D 41/40* (2006.01)
*F02M 51/06* (2006.01)
*F02D 41/20* (2006.01)

(52) U.S. Cl.
CPC ............ *F02D 41/40* (2013.01); *F02D 41/20* (2013.01); *F02M 51/06* (2013.01); *F02D 2200/0606* (2013.01); *F02D 2200/50* (2013.01)

(58) Field of Classification Search
CPC ...... F02D 41/40; F02D 41/20; F02D 2200/50; F02D 2200/0606; F02M 51/06
USPC .................. 123/435, 472, 478, 490; 701/111
See application file for complete search history.

(56) References Cited

U.S. PATENT DOCUMENTS

| | | | |
|---|---|---|---|
| 6,772,737 B2 | 8/2004 | Gaessler et al. | |
| 7,054,772 B2 | 5/2006 | Iannone et al. | |
| 7,717,088 B2 | 5/2010 | Thomas | |
| 7,746,620 B2 | 6/2010 | Bedingfield | |
| 7,841,319 B2 | 11/2010 | Thomas | |
| 8,688,402 B2 * | 4/2014 | Viale | G01K 7/16 702/133 |
| 8,887,560 B2 | 11/2014 | Beer et al. | |
| 9,664,159 B2 * | 5/2017 | Namuduri | F02M 51/005 |
| 10,072,596 B2 | 9/2018 | Dames et al. | |
| 10,184,416 B2 | 1/2019 | Morris et al. | |
| 10,393,056 B2 * | 8/2019 | Pursifull | F02D 41/3854 |
| 10,731,593 B2 | 8/2020 | Sumilla et al. | |
| 10,760,518 B2 * | 9/2020 | Pursifull | F02D 41/2432 |
| 10,844,804 B2 | 11/2020 | Pursifull et al. | |
| 10,865,721 B1 | 12/2020 | Thomas et al. | |
| 10,900,436 B2 | 1/2021 | Pursifull et al. | |
| 10,934,955 B2 | 3/2021 | Pursifull et al. | |
| 10,947,923 B2 | 3/2021 | Pursifull et al. | |
| 10,954,880 B1 | 3/2021 | Thomas et al. | |

(Continued)

FOREIGN PATENT DOCUMENTS

JP  2003328812  * 11/2003 ............. F02D 41/30

OTHER PUBLICATIONS

Pursifull, R. et al., "System and Method for Injecting Fuel to an Engine," U.S. Appl. No. 17/017,791, filed Sep. 11, 2020, 33 pages.

(Continued)

*Primary Examiner* — Hai H Huynh
(74) *Attorney, Agent, or Firm* — Geoffrey Brumbaugh McCoy Russell LLP

(57) ABSTRACT

Methods and systems are provided for estimating a temperature of a direct injector. In one example, a method may include estimating the temperature of the direct injector based on a resistance of a solenoid coil of the direct injector. In one example, a pulse-width of the direct injector during an opening phase is adjusted in response to the temperature.

17 Claims, 5 Drawing Sheets

(56) References Cited

U.S. PATENT DOCUMENTS 10,989,132 B2 4/2021 Thomas et al.
11,035,316 B1 6/2021 Pursifull et al.

OTHER PUBLICATIONS

Pursifull, R. et al., "Method and System for Adjusting Operation of a Fuel Injector," U.S. Appl. No. 17/039,589, filed Sep. 30, 2020, 36 pages.

Kiwan, R. et al., "Method and System for Fuel Injector Balancing," U.S. Appl. No. 17/093,384, filed Nov. 9, 2020, 62 pages.

Pursifull, R. et al., "Method and System for Multiple Injections," U.S. Appl. No. 17/157,849, filed Jan. 25, 2021, 50 pages.

Oshinsky, D. et al., "Methods and Systems for Fuel Injection Control," U.S. Appl. No. 17/198,106, filed Mar. 10, 2021, 55 pages.

Campbell, I. et al., "Methods and Systems for Improving Fuel Injection," U.S. Appl. No. 17/203,606, filed Mar. 16, 2021, 32 pages.

Pursifull, R. et al., "Methods and Systems for Compensating for Fuel Injector Closing Time," U.S. Appl. No. 17/204,254, filed Mar. 17, 2021, 43 pages.

Pursifull, R. et al., "Methods and Systems for Improving Fuel Injection Repeatability," U.S. Appl. No. 17/205,384, filed Mar. 18, 2021, 44 pages.

Kiwan, R. et al., "Methods and Systems for Controlling Fuel Injector Holding Current," U.S. Appl. No. 17/209,014, filed Mar. 22, 2021, 40 pages.

Pursifull, R. et al., "Method and System for Operating a Fuel Injector," U.S. Appl. No. 17/240,165, filed Mar. 26, 2021, 34 pages.

Kiwan, R. et al., "Methods and Systems for Improving Fuel Injection Repeatability," U.S. Appl. No. 17/302,496, filed May 4, 2021, 63 pages.

Kiwan, R. et al., "Methods and Systems for Fuel Injector Balancing," U.S. Appl. No. 17/302,498, filed May 4, 2021, 54 pages.

Pursifull, R. et al., "Methods and Systems for Improving Fuel Injection Repeatability," U.S. Appl. No. 17/303,085, filed May 19, 2021, 43 pages.

Pursifull, R et al., "Methods and Systems for Improving Fuel Injection Repeatability," U.S. Appl. No. 17/304,721, filed Jun. 24, 2021, 48 pages.

Pursifull, R. et al., "Methods and Systems for Improving Fuel Injection Repeatability," U.S. Appl. No. 17/304,728, filed Jun. 24, 2021, 47 pages.

\* cited by examiner

| Inj. temp (°C) | Holding Current Limit Cycle (µs) | Injector Opening Time (µs) | FPW adjustment |
|---|---|---|---|
| 100 | 90 | 280 | increase |
| 60 | 100 | 300 | none |
| 20 | 110 | 320 | decrease |
| 0 | 115 | 330 | decrease |
| -40 | 125 | 330 | decrease |

FIG. 5

METHODS AND SYSTEMS FOR ESTIMATING INJECTOR TIP TEMPERATURES

FIELD

The present description relates generally to estimate an injector tip temperature and adjust an injector transfer function based on the injector tip temperature.

BACKGROUND/SUMMARY

Engines may be configured to deliver fuel to an engine cylinder using one or more of port and direct injection. Port fuel direct injection (PFDI) engines may be capable of leveraging both fuel injection systems. For example, at high engine loads, fuel may be directly injected into an engine cylinder via a direct injector, thereby leveraging the charge cooling properties of the direct injection (DI). At lower engine loads and at engine starts, fuel may be injected into an intake port of the engine cylinder via a port fuel injector, reducing particulate matter emissions. During still other conditions, a portion of fuel may be delivered to the cylinder via the port injector while a remainder of the fuel is delivered to the cylinder via the direct injector.

Over time, discrepancies between the injectors of the cylinders may develop, resulting in inaccurate fueling. To compensate for injector variability, correction coefficients determined for correcting injection parameters may be used. However, one difficult variation to correct may occur following a period of disuse. Upon reactivation following the period of disuse, the fuel injectors may inject lean for some amount of time, which may impact engine operation.

One example approach is shown by Morris et al. in U.S. Pat. No. 10,184,416. Therein, an injector tip temperature is modeled and operation of the fuel injector is adjusted based on the model. If the injectors have been deactivated and a reactivation is requested, then the fuel pulse width is adjusted to compensate for the lean fueling errors that may follow a deactivation.

Other example approaches teach monitoring a solenoid resistance following a period of injector inactivity. The approach includes applying an extra pulse-width (PW) the injector following the period of injector activity to compensate for a change in injector opening time.

However, the inventors have identified some issues with the approaches described above. For example, the temperature model of Morris relies on multiple injections in order to correct direct injector errors. Thus, following a period of DI deactivation with PFI occurring, a restart of the DI may include multiple undesirably lean fuel injections prior to any correction being executed due to an opening time being shorter than a desired opening time.

In the example where solenoid resistance is used to apply PW corrections upon a direct injector reactivation, PW corrections are applied only following a period of inactivity with port-fuel injections still occurring. However, other conditions may demand PW corrections, such as during a cold-start or following a period of direct injector and port-fuel injector deactivation.

In one example, the issues described above may be at least partially solved by a method for estimating a temperature of a direct injector based on a resistance of a solenoid coil of the direct injector sensed during a hold-phase. By doing this, a current change based on coil resistance may be sensed and operating parameters of the injector may be adjusted.

The injector may include periods of ramping up current to move the injector to an open position. A current profile (e.g., the opening force) during this period may depend on the injector resistance which in turn is influenced by solenoid temperature. The injector may include periods of ramping down current to move the injector to a closed position. The current profile (e.g., the closing force) during this period may depend on the injector resistance which in turn is influenced by solenoid temperature. The temperature sensitive periods in injector operation may thus correspond to opening and closing conditions. Solenoid temperature affects solenoid resistance which affects current during these voltage-controlled periods. In one example, the solenoid resistance may be inferred during a current-controlled period of injector flow, such as during the hold period. During the hold period the current limit may cycle between threshold values. That limit cycle may vary with resistance. Thus the limit cycle during the hold phase can be mapped to injector resistance and ultimately mapped to opening and closing times. Once opening and closing times (or their sum) are learned, desired DI fuel injector adjustments may be executed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an engine operating sequence illustrating a PW adjustment to an injector in response to a coil resistance.

DETAILED DESCRIPTION

Figure 1:
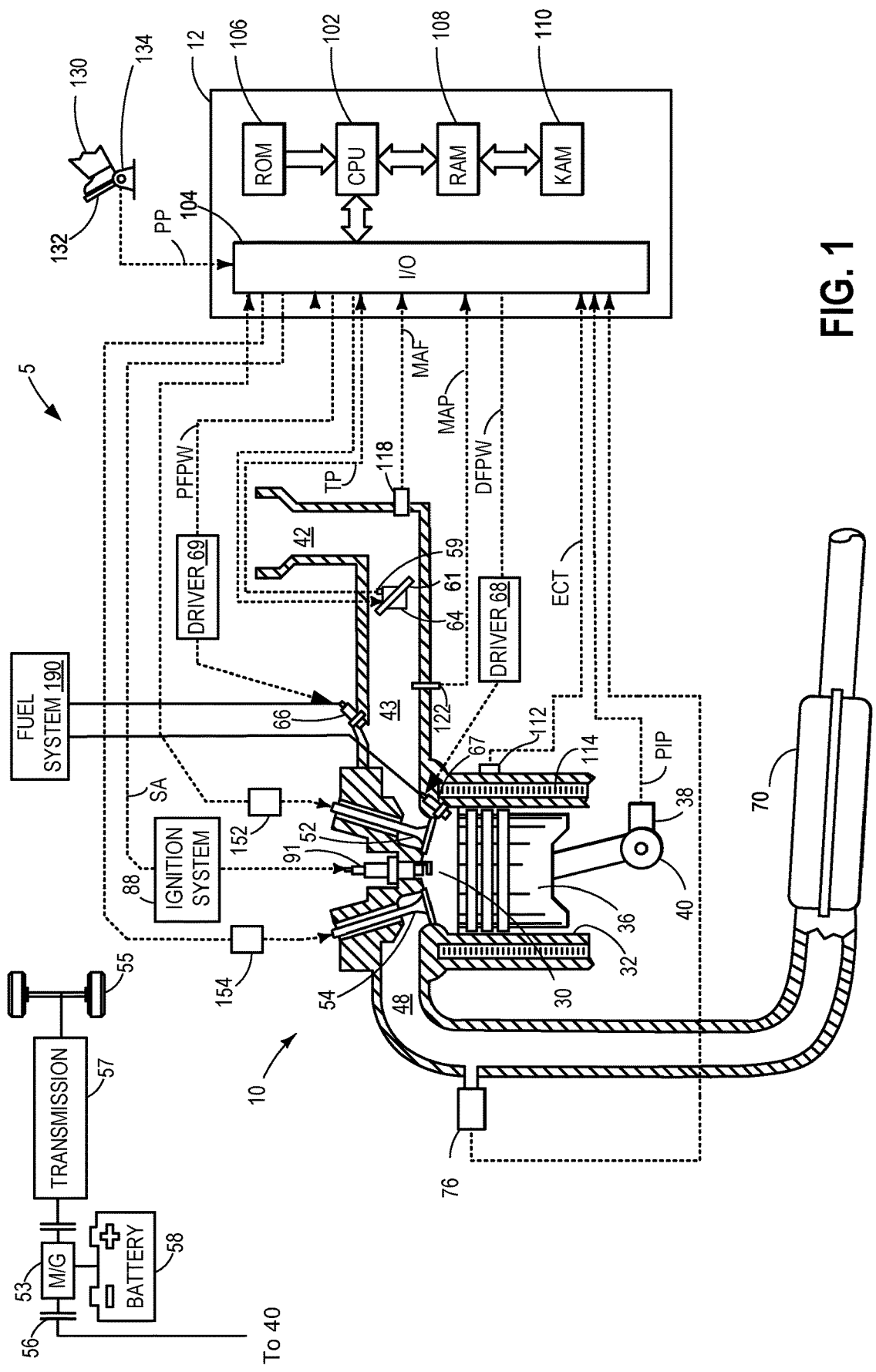
FIG. 1 shows an engine of a hybrid vehicle.
Figure 2:
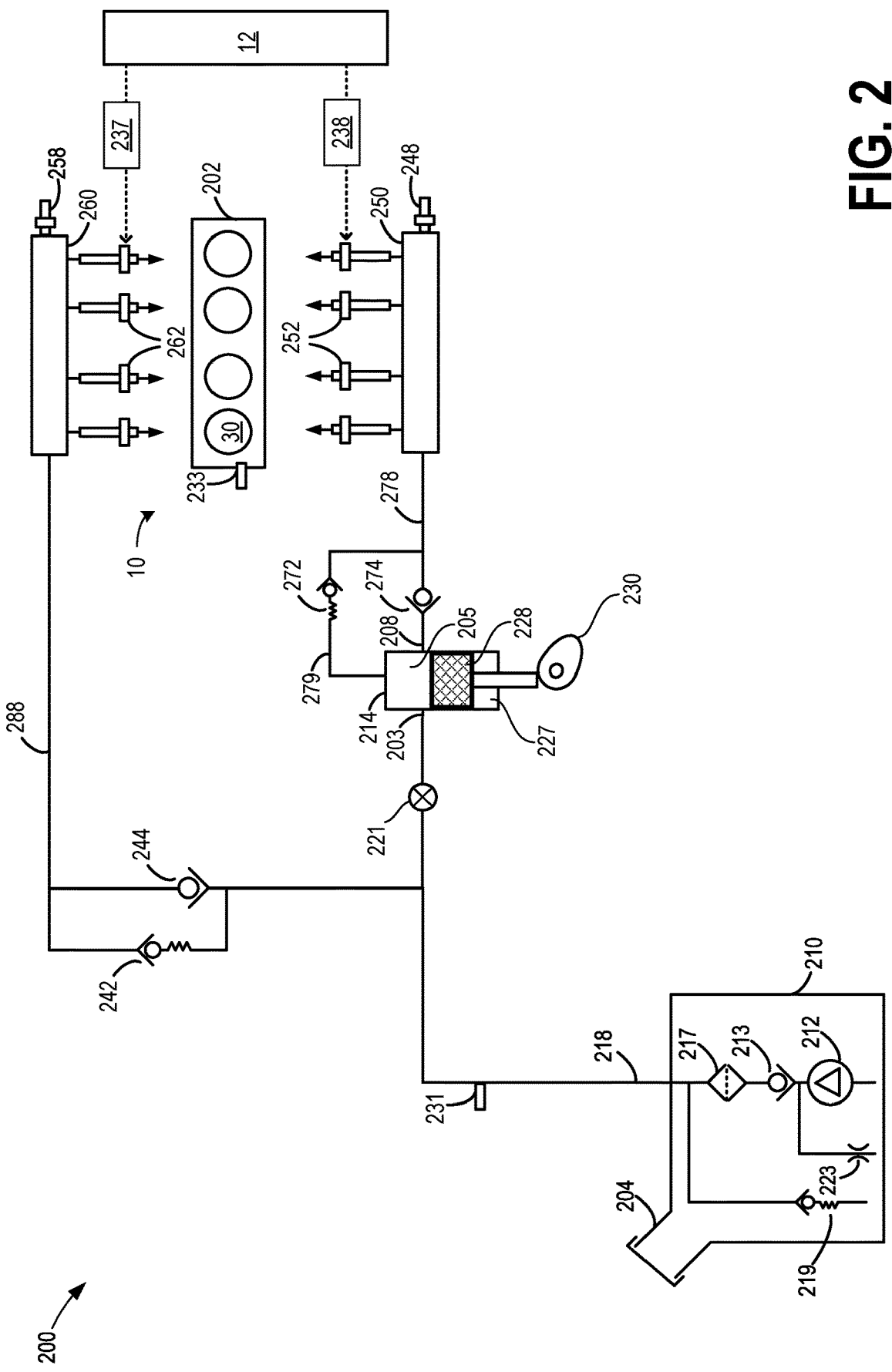
FIG. 2 shows an example fuel system coupled to the engine of FIG. 1.
Figure 3:
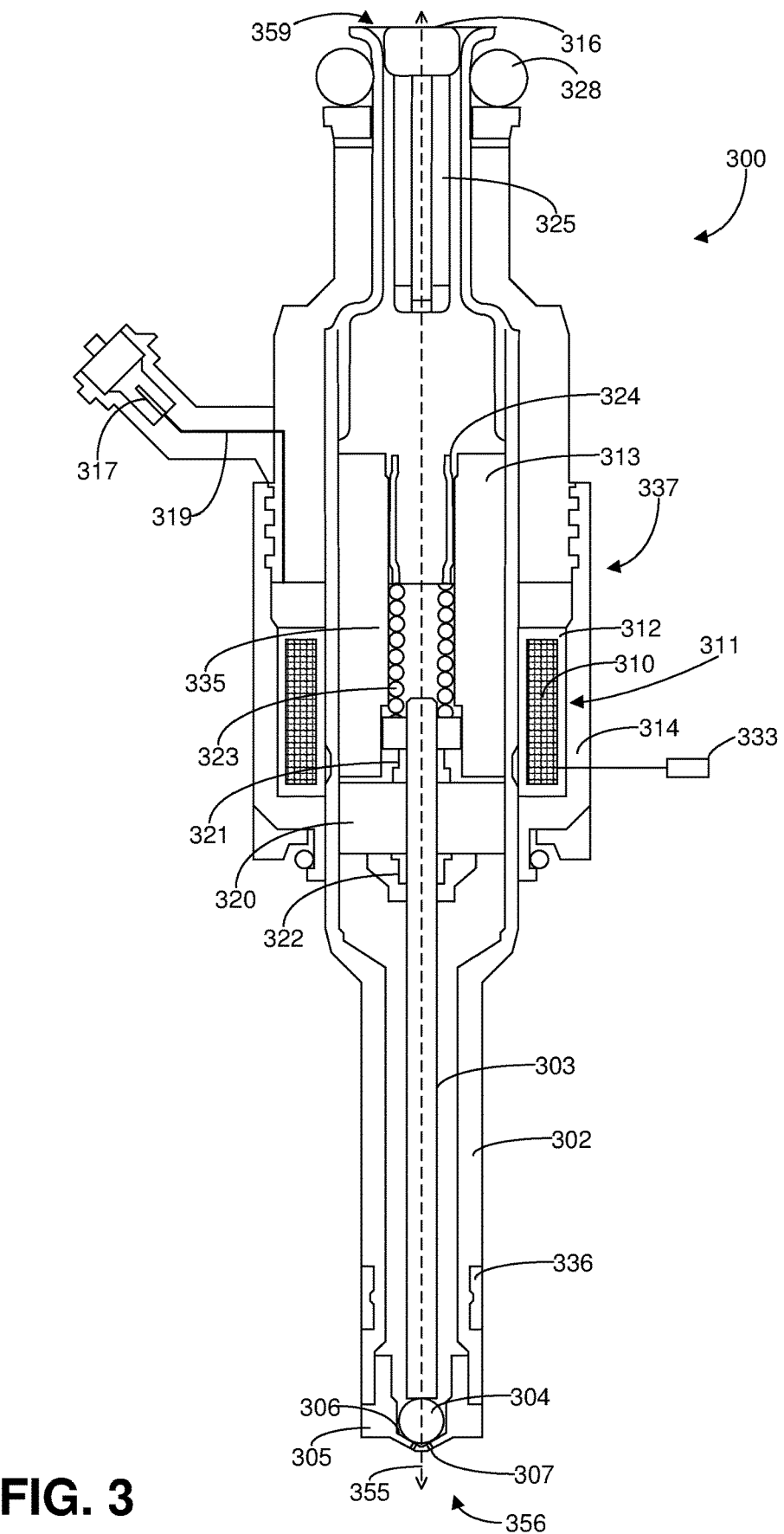
FIG. 3 shows a schematic diagram of an example fuel injector.
Figure 4:
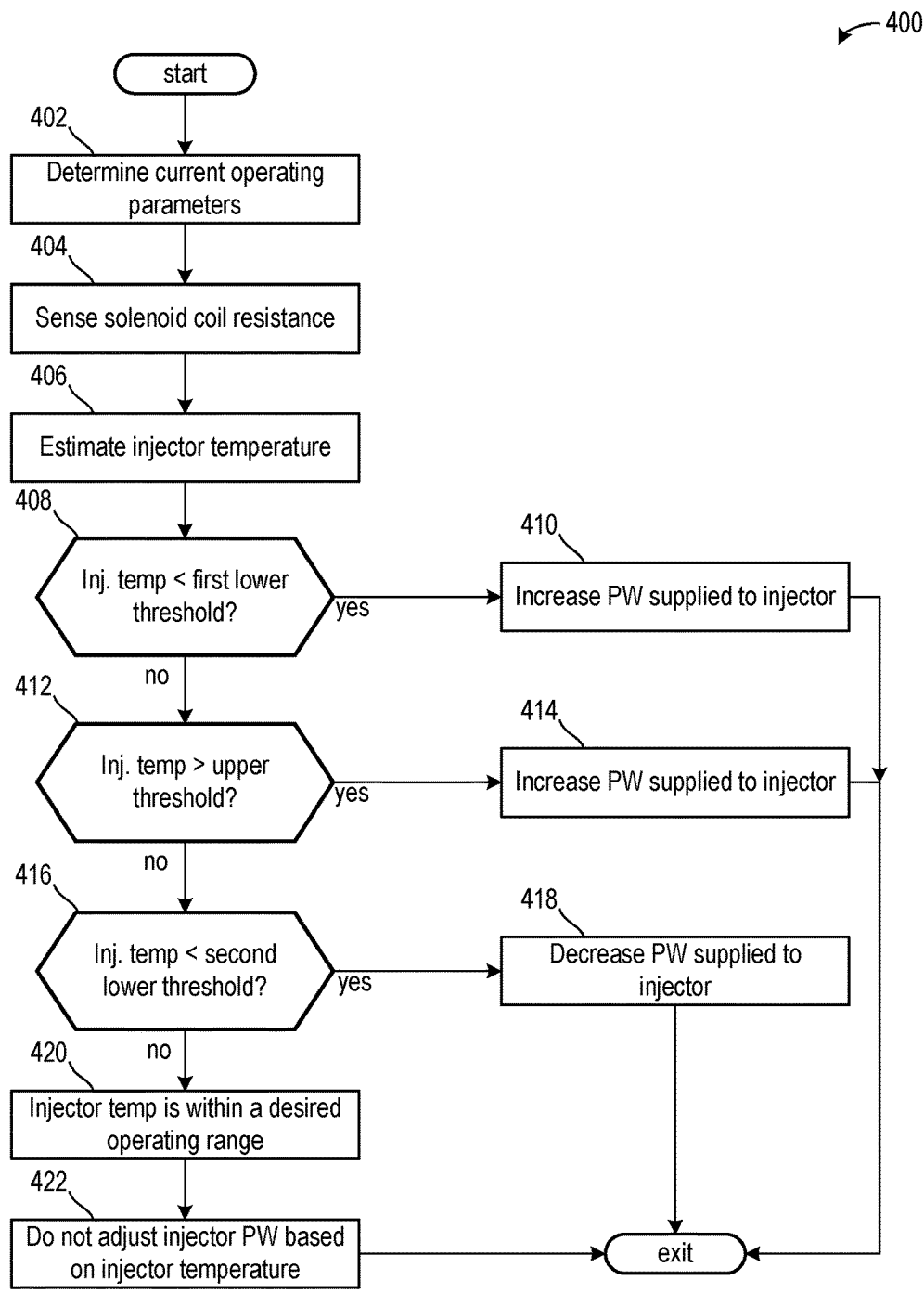
FIG. 4 shows a method for sensing a coil resistance of an injector.

The following description relates to systems and methods for estimating a temperature of an injector based on a solenoid coil resistance. The injector may be positioned to inject directly into an interior volume of a cylinder of an engine, as shown in FIGS. 1 and 2. A schematic diagram of the injector is illustrated in FIG. 3. A method for sensing a coil resistance of the injector and adjusting a PW supplied to the injector is shown in FIG. 4. An engine operating sequence graphically illustrating solenoid coil resistance fluctuations in response to relatively high and low injector temperatures is shown in FIG. 5.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a spark ignition internal combustion engine 10 with a dual injector system, where engine 10 is configured with both direct injection and port fuel injection. As such, engine 10 may be referred to as a port-fuel direct inject (PFDI) engine. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may be configured to adjust a fuel injection pattern of the fuel injectors 66 and 67 during a pressure-based injector balancing (PBIB) diagnostic. PBIB also encompasses, but it not limited to, intra-engine injector-to-injector maldistribution assessment and mitigation. The controller 12 may include instructions that when executed cause the controller 12 to adjust an injection pattern to increase an occurrence of an injection being preceded by a same cylinder bank injection. The controller 12 may be further configured to monitor a fuel rail pressure (FRP) of an inter-injection period during the PBIB diagnostic. In one example, the controller 12 may be configured to learn only FRPs of inter-injection periods for injections preceded by a same-cylinder bank injection while ignoring FRPs for injections preceded by an opposite-cylinder bank injection. Additionally or alternatively, the controller 12 may signal to skip injections from the opposite-cylinder bank, thereby increasing the occurrence of injections being preceded by a same-cylinder bank injection, which may increase a rate in which FRP data is accrued.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position (TP) from throttle position sensor 59 and a Manifold Absolute Pressure signal (MAP) from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment of a fuel system 200, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIG. 4. Components previously introduced are similarly numbered in FIG. 2. Engine 10 is shown with cylinder 30 arranged in a cylinder bank 202. The cylinder bank 202 may be one of a plurality of cylinder banks of the engine 10, each of the banks identical in configuration.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 12 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 200 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a plurality of first injectors). Fuel lifted by the LPP 212 may also be supplied to a second fuel rail 260 coupled to one or more fuel injectors of a second group of port injectors 262 (herein also referred to as a plurality of second injectors). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective pluralities of first and second injectors 252, 262, it will be appreciated that each fuel rail 250, 260 may dispense fuel to any suitable number of fuel injectors. As one example, first fuel rail 250 may dispense fuel to one fuel injector of plurality of first injectors 252 for each cylinder of the engine while second fuel rail 260 may dispense fuel to one fuel injector of the plurality of second injectors 262 for each cylinder of the engine. Controller 12 can individually actuate each of the plurality of second injectors 262 via a port injection driver 237 and actuate each of the plurality of first injectors 252 via a direct injection driver 238. The controller 12, the drivers 237, 238 and other suitable engine system controllers can comprise a control system. While the drivers 237, 238 are shown external to the controller 12, it should be appreciated that in other examples, the controller 12 can include the drivers 237, 238 or can be configured to provide the functionality of the drivers 237, 238.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 12. Likewise, second fuel rail 260 includes a second fuel rail pressure sensor 258 for providing an indication of port injection fuel rail pressure to the controller 12. An engine speed sensor 233 (or an engine angular position sensor from which speed is deduced) can be used to provide an indication of engine speed to the controller 12. The indication of engine speed can be used to identify the speed of higher pressure fuel pump 214, since the pump 214 is mechanically driven by the engine, for example, via the crankshaft or camshaft. A solenoid controlled valve 221 may be included on the inlet side of pump 214. This solenoid controlled valve 221 may have two positions, a first pass through position and a second checked position. In the pass through position, no net pumping into the fuel rail 250 occurs. In the checked position, pumping occurs on the compression stroke of plunger/piston 228. This solenoid controlled valve 221 is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more of the pluralities of first and second injectors 252, 262. For example, during high load conditions, fuel may be delivered to a cylinder on a given engine cycle via only direct injection, wherein port injectors 262 are disabled (e.g., not injecting fuel). In another example, during mid-load conditions, fuel may be delivered to a cylinder on a given engine cycle via each of direct and port injection. As still another example, additionally or alternatively, during low load conditions, engine starts, as well as warm idling conditions, fuel may be delivered to a cylinder on a given engine cycle via only port injection, wherein direct injectors 252 are disabled. Additionally or alternatively, a balance between direct and port injection may be achieved through idle, low, medium, and high engine loads.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212 and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 12 may be used to send a control signal to the low pressure pump, as desired, to adjust the output (e.g., speed, flow output, and/or pressure) of the low pressure pump.

FIG. 3 shows a schematic diagram of an example fuel injector 300 which may be used to supply fuel from a fuel system, e.g., fuel system 200, to an engine, e.g., engine 10. Fuel injector 300 may be any type of injector. For example, fuel injector 300 may be a direct injector or a port fuel injector.

Fuel injector 300 includes a nozzle body 302 which may be used as valve-seat support and part of a valve housing. A valve mechanism 303 within nozzle body 302 is displaceable in an axial direction, e.g., along a central axis 355 of fuel injector 300. Valve mechanism may be a pintle or needle which is slideable in a direction of central axis 355, for example. In some examples, valve mechanism 303 may be composed at least partially of a material that is permanently magnetized. For example, valve mechanism 303 may be composed of a material, such as iron, which can be magnetized by an external magnetic field and remain magnetized after the external field is removed. In other examples, valve mechanism 303 may be substantially composed of a ferromagnetic material, such as iron, nickel, cobalt and/or alloys thereof.

Fuel injector 300 may be an inwardly opening fuel injector, which has at least one spray-discharge orifice 307 formed in valve-seat body 305 so that when an injector driver circuit 311 is activated to actuate the valve mechanism, the valve mechanism 303 lifts off from the valve mechanism seat 305 to create a gap between valve closure member 304 and valve seat surface 306 so that fuel may flow out orifices 307.

Valve mechanism 303 is coupled to a valve-closure member 304, which cooperates with a valve-seat surface 306 formed on a valve mechanism seat body 305 to form a sealing seat. Valve mechanism seat body 305 may be fixedly coupled to the downstream end 356 of nozzle body 302. However, valve-seat surface 306 may also be formed directly on a base part of nozzle body 302. For example, valve-closure member 304 may be ball-shaped or frusto-conical-shaped so that in a closed position valve-closure member 304 engages with valve-seat surface 306 to shut off fuel flow through the fuel injector via orifices, e.g., orifices 307, in the downstream end 356 of the fuel injector.

In some examples, valve-closure member 304 may be composed substantially of a permanently magnetized material instead of, or in addition to, valve mechanism 303 being composed of a permanently magnetic material. In the case when the valve mechanism and/or valve-closure member are permanently magnetized, valve seat 305 and/or valve seat surface 306 may be composed of a ferromagnetic material so that valve mechanism 303 is magnetically attracted to valve seat 305. In this way, the attracting magnetic force between the valve mechanism and valve seat may reduce bouncing when the valve mechanism and valve seat come into contact.

As another example, valve mechanism 303 and/or valve-closure member 304 may be substantially composed of a ferromagnetic material. In this example, valve seat 305 and/or valve seat surface 306 may be composed of a permanently magnetized material so that the valve mechanism and the valve mechanism seat are magnetically attracted to each other.

As still another example, both the valve mechanism and the valve seat may be permanently magnetized so that an attracting magnetic force is present between the two components. In this case, the magnetic dipole of the magnetized valve mechanism may be substantially anti-parallel to a magnetic dipole of the valve mechanism seat. For example, the magnetic dipole of the valve mechanism may be positioned approximately 180° with respect to the magnetic dipole of the valve seat or in a suitable range thereof, for example between 90° and 270° with respect to the magnetic dipole of the valve seat. For example, a magnetic dipole of the valve mechanism may extend along a central axis 355 of the fuel injector from downstream end 356 to upstream end 359 whereas the magnetic dipole moment of the valve seat may extend along an opposite direction, namely along the central axis 355 from the upstream end 359 to the downstream end 356. In this way, the poles of the magnetized valve mechanism and the magnetized valve seat are attracted to each other via the magnetic fields present in the valve mechanism and the valve seat.

In some examples, valve mechanism 303 may penetrate an armature 320 in an inner opening in an upstream valve housing 337. Armature 320 may be coupled to valve mechanism 303 so as to be axially displaceable along a direction of central axis 355. The path of magnetic armature 320 in the direction of the central axis 355 may be restricted by a first, upper flange 321, which may be integrally formed with an upstream portion of valve mechanism 303, and a second, lower flange 322, which is coupled to valve mechanism 303 downstream of armature 320. Braced on first flange 321 is a restoring spring 323 which biases the valve mechanism 303 in a closed position against the valve mechanism seat 305. Restoring spring 323 may be pre-stressed by an adjustment sleeve 324.

Upstream valve housing 337 includes an injector driver 311 which actuates the valve mechanism in response to a start of injection (SOI) event. The injector driver 311 may include an electromagnetic actuator for actuating the valve mechanism and may include a magnetic coil 310 wound onto a coil brace 312, which rests against a connection piece 313 acting as inner pole 335. Current may be supplied in magnetic coil in two opposite directions and at varying amounts depending on operating conditions. In an outward direction from central axis 355, the magnetic circuit may be sealed by an outer magnetic component 314. Magnetic coil 310 is energized via a line 19 by an electric current that may be supplied via an electric plug contact 317.

A resistance of the magnetic coil 310 may be sensed by a multimeter 333. The multimeter 333 may be configured to provide feedback to a controller (e.g., controller 12 of FIG. 1). In one example, the multimeter 333 may actively sense a resistance of the magnetic coil 310. In another example, additionally or alternatively, the multimeter 333 may be periodically activated based on operating conditions of the engine (e.g., engine 10 of FIG. 1). In one example, the multimeter 333 is activated in response to a cold-start occurring or in response to a period of direct injector inactivity. The controller, in response to an estimated injector temperature based on the sensed resistance, may increase or decrease a current supplied to the magnetic coil 310 during an opening of the injector, thereby increasing the PW. In one example, if the resistance is high, then a previously calibrated current supply may be insufficient, leading to shorter opening and/or closing times. If the resistance is low, then the previously calibrated current supply may be too high, leading to longer opening and/or closing times. Longer opening and/or closing times may lead to over-fueling and shorter opening and/or closing times may lead to under-fueling, which may disrupt a cylinder fuel balancing and/or uniformity formally balanced during a pressure-based injector balancing (PBIB) diagnostic. Adjusting direct injector operation via a PW provided thereto in response to the estimated injector temperature is described in greater detail below.

In some embodiments, additionally or alternatively, a multimeter configured to measure the solenoid coil resistance may be utilized. As such the limit cycle and applied voltage during the hold period may be measured and mapped to opening time, closing time, or their sum. As a further simplifying alternative one may use the average applied voltage over a limit cycle and use that number to map to opening/closing times. For example, if the duty cycle is 33% and voltage is 12 V, then the average voltage is 0.33×12 V=4 V. In other words, it takes an average of 4 V to hold the injection solenoid current between the min and max current thresholds. 4 V at a mean current (e.g. 2.4 A) implies a solenoid resistance of 4/2.4=1.67 ohms (including all injector wiring).

The fuel is supplied via a central fuel supply 316 at an upstream end 359 of fuel injector 300 and filtered by a filter element 325 inserted therein. Fuel injector 300 may be sealed from a fuel distributor line, e.g., fuel rail 216, by a seal 328 and from a cylinder head, e.g., cylinder 30, by another seal 336.

In particular, fuel injector 300 may receive fuel pulse width signal FPW (e.g., current) from controller 12 to control fuel injection. Signal FPW governs fuel injection by energizing electromagnetic actuator coil 310 to initiate the start of injection (SOI) of fuel from fuel injector 300. Additionally, FPW may dictate the end of injection (EOI) of fuel from fuel injector 300. In particular, during fuel injection, pressurized fuel may be supplied from fuel rail 216 (shown in FIG. 2) to fuel injector 300 via an inlet of central fuel supply 316, the flow of which is governed by the electromagnetic actuator having magnetic coil 310, coupled to valve mechanism 303 which lifts from valve seat 305 to spray fuel into cylinder 30. Herein, FPW and current may be used interchangeably.

In operation, restoring spring 323 acts upon first flange 321 of valve mechanism 303 to counter to its lift direction, so that valve-closure member 304 is retained in sealing contact against valve seat surface 306. Excitation of magnetic coil 310 may be performed by supplying a first amount of current in a first direction through magnetic coil 310. The first amount of current in the first direction generates a magnetic field which attracts valve mechanism 303 upwards to lift valve mechanism 303 off of valve seat 305. For example, the magnetic field may move magnetic armature 320 in the lift direction to counter to the spring force of restoring spring 323. The overall lift of the valve mechanism may be defined by a working gap existing between connection piece 313 and magnetic armature 320 in the rest position. Magnetic armature 320 carries along first flange 321 in the lift direction as well. Valve-closure member 304, which is connected to valve mechanism 303, lifts off from valve seat surface 306 and the fuel is spray-discharged through spray-discharge orifices 307.

In some examples, additionally or alternatively, mapping values other than temperature may be used to map the resistance to an opening time, a closing time, or a sum of the two. For example, instead of measuring actual resistance, a function of applied voltage and a limit cycle duration may be mapped. In this way, the applied voltage and limit cycle duration may represent the resistance, similar to temperature values described above. As resistance or the estimation of resistance changes, current during opening and closing conditions, along with force, may also change.

Turning now to FIG. 4, it shows a method 400 for monitoring a solenoid resistance of an injector to estimate a temperature thereof. In one example, the injector is a direct injector, identical to one of the direct injectors of the first group of direct injectors 252 of FIG. 2. The direct injector may be configured similarly to the fuel injector 300 of FIG. 3, in one example. Instructions for carrying out method 400 may be executed by a controller based on instructions stored on a memory of the controller and in conjunction with signals received from sensors of the engine system, such as the sensors described above with reference to FIGS. 1, 2, and 3. The controller may employ engine actuators of the engine system to adjust engine operation, according to the method described below.

At 402, the method 400 includes determining current operating parameters. Current operating parameters may include but are not limited to one or more of throttle position, manifold vacuum, engine speed, engine temperature, vehicle speed, and an air/fuel ratio.

At 404, the method 400 may include sensing solenoid coil resistance. The solenoid coil resistance may be sensed via a multimeter, such as multimeter 333 of FIG. 3. The multimeter may provide feedback to a controller (e.g., controller 12 of FIG. 1) wherein the controller may estimate an injector temperature in response to the solenoid coil resistance. In one example, the multimeter senses the solenoid coil resistance during a holding phase of the injector. In this way, the solenoid coil resistance is not sensed during an opening or a closing of the injector.

In one example, during current control provided during the holding phase, a current limit may cycle between an upper threshold hold current and a lower threshold hold current, wherein the upper and lower threshold hold currents are based on non-zero, positive numbers. A limit cycle period (e.g., a duty cycle) may reflect a resistance of the injector solenoid coil in combination with the present battery voltage. An injector opening time may be adjusted to a desired opening time by learning a holding current duty cycle and estimating an injector temperature.

In one example, the injector opening time may not be based or dependent on the holding current duty cycle. However, the injector solenoid coil resistance may be sensed during the holding phase, which may be used to estimate an injector temperature, wherein the injector opening time is directly proportional to the injector temperature.

In a current limit cycle where a battery voltage is applied, the current rise may be based on the battery voltage and the coil resistance. When the battery voltage is removed and the current recirculates, a drop in current may be proportional to the solenoid coil resistance. By doing this, an injector temperature sensor or other temperature measuring device for directly measuring the injector temperature may be omitted, thereby decreasing manufacturing costs and packaging size.

At 406, the method 400 may include estimating an injector temperature. In one example, a multi-input look-up table, wherein inputs include a battery voltage and a solenoid resistance, may include outputs corresponding to the estimated injector temperature. In one example, the solenoid resistance may increase as injector temperature increases. Thus, solenoid resistance may decrease as the injector temperature decreases. That is to say, the controller may receive feedback regarding the coil resistance and the battery voltage, the controller may input the coil resistance and battery voltage values into the multi-input look-up table, wherein the multi-input look-up table may output an estimated injector temperature.

At 408, the method 400 may include determining if an injector temperature is less than a first lower threshold temperature. The first lower threshold temperature may be based on a temperature below a lowest temperature of a desired operating temperature range. In one example, the first lower threshold temperature is less than −20° C.

If the estimated injector temperature is less than the first lower threshold temperature, then at 410, the method 400 may include increasing a magnitude of a FPW supplied to the injector. By doing this, an injector opening time may be increased to a desired opening time despite the injector temperature being relatively low, which may result in a desired fueling amount as opposed to under-fueling.

If the injector temperature is not less than the first lower threshold temperature, then at 412, the method 400 may include determining if the injector temperature is greater than an upper threshold temperature. The upper threshold temperature may be based on a non-zero, positive value that is greater than a highest temperature of a desired operating temperature range. In one example, the upper threshold temperature may be equal to 80° C. or greater.

If the injector temperature is greater than the upper threshold temperature, then at 414, the method 400 may include increasing the magnitude of the FPW supplied to the injector, similar to 410 as described above.

If the injector temperature is not greater than the upper threshold temperature, then at 416, the method 400 may include determining if the estimated injector temperature is less than a second lower threshold temperature. The second lower threshold temperature may be greater than the first lower threshold temperature and less than a lower temperature of a desired operating temperature range. In one example, the second lower threshold temperature is between 0 and 20° C.

If the method 400 determines that the injector temperature is less than the second lower threshold temperature 416, then the injector temperature is greater than the first lower threshold temperature and less than the second lower threshold temperature, and at 418, the method 400 may include decreasing a magnitude of a FPW supplied to the injector. In this way, the injector opening time may be decreased to the desired injector opening time such that the injector may inject a desired amount of fuel rather than over-fueling the cylinder.

If the injector temperature is not less than the second lower threshold temperature, then at 420, the method 400 may include determining that the injector temperature is within a desired operating range. As such, an injector opening time may be substantially equal to the desired opening and a FPW supplied thereto is not adjusted.

At 422, the method 400 may include not adjusting the injector FPW based on the estimated injector temperature. As such, the injector FPW may be adjusted only in response to the injector temperature falling below the first or second lower threshold temperatures or above the upper threshold temperature.

Turning now to FIG. 5, it shows a table 500 illustrating a plurality of values for a direct injector temperature, a holding current limit cycle, an injector opening time, and a FPW adjustment. Row 510 illustrates a condition where a direct injector opening time is less than a desired opening time. The direct injector opening time may be less than the desired opening time due to the injector temperature being greater than the upper threshold temperature, thereby increase a resistance of the coil, as determined by sensing the holding current limit cycle. As such, the FPW adjustment may include increasing the FPW relative to a FPW amount during operating conditions where the injector temperature is within a desired temperature operating range.

Row 520 illustrates a condition where the direct injector temperature is within the desired temperature operating range. Thus, the direct injector opening time is substantially equal to a desired opening time. The FPW is not adjusted.

Rows 530, 540, and 550 each illustrate a condition where the direct injector temperature is less than the desired temperature operating range. The direct injector opening time is greater than the desired opening time. As such, the direct injector may inject more than the desired amount of fuel. The direct injector temperature is less than the second lower threshold temperature and greater than the first threshold temperature. The FPW adjustment may include decreasing the FPW supplied to the coil of the direct injector. As such, the opening time may be reduced and a desired amount of fuel may be injected.

In one real world example, a vehicle includes an engine having cylinders, each equipped with a port-fuel injector and a direct injector. Following a period of shut-down, the engine may be activated and undergo a cold-start. At a beginning of the cold-start, the injector temperature may be less than the first lower threshold temperature, which may be determined by sensing a solenoid coil resistance during a hold phase of the injector.

During an initial portion of the cold-start where the injector temperature may be less than the first lower threshold temperature, the FPW adjustment may include increasing a current supplied to the injector coil to increase the injector opening time to a desired opening time. Following the initial period, the injector temperature, as estimated via sensing an injector coil resistance, may increase above the first lower threshold temperature while remaining below the second lower threshold temperature. When above the first lower threshold temperature and below the second lower threshold temperature, the injector opening time may increase above the desired opening time. As such, the injector may over-fuel without an adjustment. The FPW adjustment may include decreasing the current supplied to the injector coil to decrease its opening time.

Following a period of engine and direct injector operation, the estimated temperature of the direct injector may be equal to a temperature within the desired temperature operating range. As such, in this range, the injector opening times may be substantially equal to the desired opening time such that PW adjustments may not be applied based on an estimated temperature of the injector. However, adjustments may be applied based on injector-to-injector variances as determined via an injector balancing diagnostic.

During some conditions of the engine operation, periods of direct injector inactivity may occur. Based on the inactivity, the temperature of the direct injector may increase or decrease. For example, if the direct injectors are deactivated and port-fueling still occurs, then the estimated temperature of the direct injectors may increase to a temperature greater than the upper threshold temperature. When the estimated temperature of the direct injector is greater than the upper threshold temperature, the injector opening time may be less than the desired opening time once the direct injector is reactivated, resulting in the injector providing less than the desired amount of fuel (e.g., under-fueling). As such, a PW adjustment may include increasing current supplied to the coil.

One way to measure resistance is to apply a voltage and measure the resulting current, or apply a current and measure the resulting voltage. The resistance measurement can occur during the time when voltage is being applied to the injector. A period of particular convenience is during the hold period (after opening and before closing). However, it is also possible to measure injector resistance when the injector is neither opening, closing, or being help open. For example, a controller can apply a voltage of 2 volts (or current of 1 amp) away from the injection period and make a standard R=V/I resistance computation. Given the present design of the injector driver, putting the injector driver into hold mode at 1 A without an injector opening period would be a way to imposed a current, measure a voltage, and thus compute a resistance with zero fuel metered to the engine.

As another example, if the direct injector inactivity is accompanied by a period of port-fuel injector inactivity, such as during a coasting event where combustion does not occur, then the direct injector temperature may decrease to a temperature below the second lower threshold temperature. Once the injector is reactivated, opening times may be greater than the desired opening time as described above. Thus, current supplied to the direct injector coil may be reduced In this way, injector opening times of a plurality of direct injectors may be predicted based on estimated temperatures of the plurality of direct injectors, the estimated temperatures based on sensed coil resistances of the direct injectors. A difference between the estimated temperature and bounds of a desired temperature operating range may be determined and a FPW adjustment may be applied based on the difference. For example, as the estimated temperature decreases further below a lower bound of the desired temperature operating range, the PW adjustment may shift from decreasing current supplied to the injector coil to increasing the current. The technical effect of adjusting the direct injector operation in response to its estimated temperature is to correct fueling errors more quickly, such as prior to the direct injector executing an initial injection upon reactivation, and to decrease manufacturing costs and control system complexities.

The disclosure also provides support for a method, comprising: estimating a temperature of a direct injector based on a resistance of a solenoid coil of the direct injector sensed during a hold-phase. In a first example of the method, estimating the temperature of the direct injector is further based on a voltage of a battery. In a second example of the method, optionally including the first example, the method further comprises: adjusting a fuel pulse-width supplied to the solenoid coil of the direct injector during an opening phase in response to the temperature. In a third example of the method, optionally including one or both of the first and second examples, the method further comprises: increasing the fuel pulse-width in response to the temperature being greater than an upper threshold temperature or less than a first lower threshold temperature. In a fourth example of the method, optionally including one or more or each of the first through third examples, the method further comprises: decreasing the fuel pulse-width in response to the temperature being greater than the first lower threshold temperature and less than a second lower threshold temperature, wherein the second lower threshold temperature is greater than the first lower threshold temperature and less than a lowest desired operating temperature of a desired temperature operating range of the direct injector. In a fifth example of the method, optionally including one or more or each of the first through fourth examples, the method further comprises: maintaining a fuel pulse-width supplied to the solenoid coil of the direct injector in response to the temperature being equal to a temperature within a desired temperature operating range. In a sixth example of the method, optionally including one or more or each of the first through fifth examples, the method further comprises: sensing the resistance of the solenoid coil via a multimeter.

The disclosure also provides support for a system, comprising: an engine, a plurality of cylinders comprising a plurality of port-fuel injectors and a plurality of direct injectors, and a controller comprising computer-readable instructions stored on non-transitory memory thereof that when executed cause the controller to: sense a resistance of a solenoid coil of a direct injector of the plurality of direct injectors, estimate a temperature of the direct injector based on the resistance, and adjust a fuel pulse-width in response to the temperature being outside a desired temperature operating range. In a first example of the system, the instructions further cause the controller to increase the fuel pulse-width via increasing a current supplied to the solenoid coil in response to the temperature being greater than a highest temperature of the desired temperature operating range. In a second example of the system, optionally including the first example, the instructions further cause the controller to increase the fuel pulse-width via increasing a current supplied to the solenoid coil in response to the temperature being less than a first lower threshold temperature, wherein the first lower threshold temperature is less than a lowest temperature of the desired temperature operating range. In a third example of the system, optionally including one or both of the first and second examples, the instructions further cause the controller to decrease the fuel pulse-width via decreasing the current supplied to the solenoid coil in response to the temperature being less than a second lower threshold temperature and greater than the first lower threshold temperature, wherein the second lower threshold temperature is less than the lowest temperature of the desired temperature operating range. In a fourth example of the system, optionally including one or more or each of the first through third examples, the instructions further cause the controller to maintain the fuel pulse-width in response to the temperature being equal to a temperature within the desired temperature operating range. In a fifth example of the system, optionally including one or more or each of the first through fourth examples, the instructions further cause the controller to adjust the fuel pulse-width only in response to the temperature being outside the desired temperature operating range. In a sixth example of the system, optionally including one or more or each of the first through fifth examples, the resistance of the solenoid coil is sensed only following a period of direct injector inactivity. In a seventh example of the system, optionally including one or more or each of the first through sixth examples, the resistance of the solenoid coil is sensed during a hold-phase of the plurality of direct injectors.

The disclosure also provides support for a method, comprising: estimating a temperature of a direct injector based on a resistance of a solenoid coil of the direct injector and a voltage of a battery. In a first example of the method, the method further comprises: adjusting an opening time of the direct injector in response to the temperature being outside of a desired temperature operating range and maintaining the opening time of the direct injector in response to the temperature being within the desired temperature operating range. In a second example of the method, optionally including the first example, the opening time is adjusted by adjusting a current supplied to the solenoid coil. In a third example of the method, optionally including one or both of the first and second examples, the method further comprises: sensing the resistance of the solenoid coil and the voltage of the battery during a hold-phase of the direct injector. In a fourth example of the method, optionally including one or more or each of the first through third examples, the method further comprises: estimating the temperature of the direct injector only following periods of inactivity of the direct injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
estimating a temperature of a direct injector based on a resistance of a solenoid coil of the direct injector sensed during a hold-phase; and
adjusting a fuel pulse-width supplied to the solenoid coil of the direct injector during an opening phase in response to the temperature.

2. The method of claim 1, wherein estimating the temperature of the direct injector is further based on a voltage of a battery.

3. The method of claim 1, further comprising increasing the fuel pulse-width in response to the temperature being greater than an upper threshold temperature or less than a first lower threshold temperature.

4. The method of claim 3, further comprising decreasing the fuel pulse-width in response to the temperature being greater than the first lower threshold temperature and less than a second lower threshold temperature, wherein the second lower threshold temperature is greater than the first lower threshold temperature and less than a lowest desired operating temperature of a desired temperature operating range of the direct injector.

5. The method of claim 1, further comprising maintaining the fuel pulse-width supplied to the solenoid coil of the direct injector in response to the temperature being equal to a temperature within a desired temperature operating range.

6. The method of claim 1, further comprising sensing the resistance of the solenoid coil via a multimeter.

7. A system, comprising:
an engine;
a plurality of cylinders comprising a plurality of port-fuel injectors and a plurality of direct injectors; and
a controller comprising computer-readable instructions stored on non-transitory memory thereof that when executed cause the controller to:
sense a resistance of a solenoid coil of a direct injector of the plurality of direct injectors;
estimate a temperature of the direct injector based on the resistance; and
adjust a fuel pulse-width in response to the temperature being outside a desired temperature operating range.

8. The system of claim 7, wherein the instructions further cause the controller to increase the fuel pulse-width via increasing a current supplied to the solenoid coil in response to the temperature being greater than a highest temperature of the desired temperature operating range.

9. The system of claim 7, wherein the instructions further cause the controller to increase the fuel pulse-width via increasing a current supplied to the solenoid coil in response to the temperature being less than a first lower threshold temperature, wherein the first lower threshold temperature is less than a lowest temperature of the desired temperature operating range.

10. The system of claim 9, wherein the instructions further cause the controller to decrease the fuel pulse-width via decreasing the current supplied to the solenoid coil in response to the temperature being less than a second lower threshold temperature and greater than the first lower threshold temperature, wherein the second lower threshold temperature is less than the lowest temperature of the desired temperature operating range.

11. The system of claim 7, wherein the instructions further cause the controller to maintain the fuel pulse-width in response to the temperature being equal to a temperature within the desired temperature operating range.

12. The system of claim 7, wherein the instructions further cause the controller to adjust the fuel pulse-width only in response to the temperature being outside the desired temperature operating range.

13. The system of claim 7, wherein the resistance of the solenoid coil is sensed only following a period of direct injector inactivity.

14. The system of claim 7, wherein the resistance of the solenoid coil is sensed during a hold-phase of the plurality of direct injectors.

15. A method, comprising:
estimating a temperature of a direct injector based on a resistance of a solenoid coil of the direct injector and a voltage of a battery; and
adjusting an opening time of the direct injector in response to the temperature being outside of a desired temperature operating range and maintaining the opening time of the direct injector in response to the temperature being within the desired temperature operating range, wherein the opening time is adjusted by adjusting a current supplied to the solenoid coil.

16. The method of claim 15, further comprising sensing the resistance of the solenoid coil and the voltage of the battery during a hold-phase of the direct injector.

17. The method of claim 15, further comprising estimating the temperature of the direct injector only following periods of inactivity of the direct injector.

\* \* \* \* \*